May 21, 1968
A. H. BENT
3,384,305
ANGULARLY ADJUSTABLE OUTLET MEMBERS FOR
AGRICULTURAL SPRAYING APPARATUS
Filed June 6, 1966
2 Sheets-Sheet 1
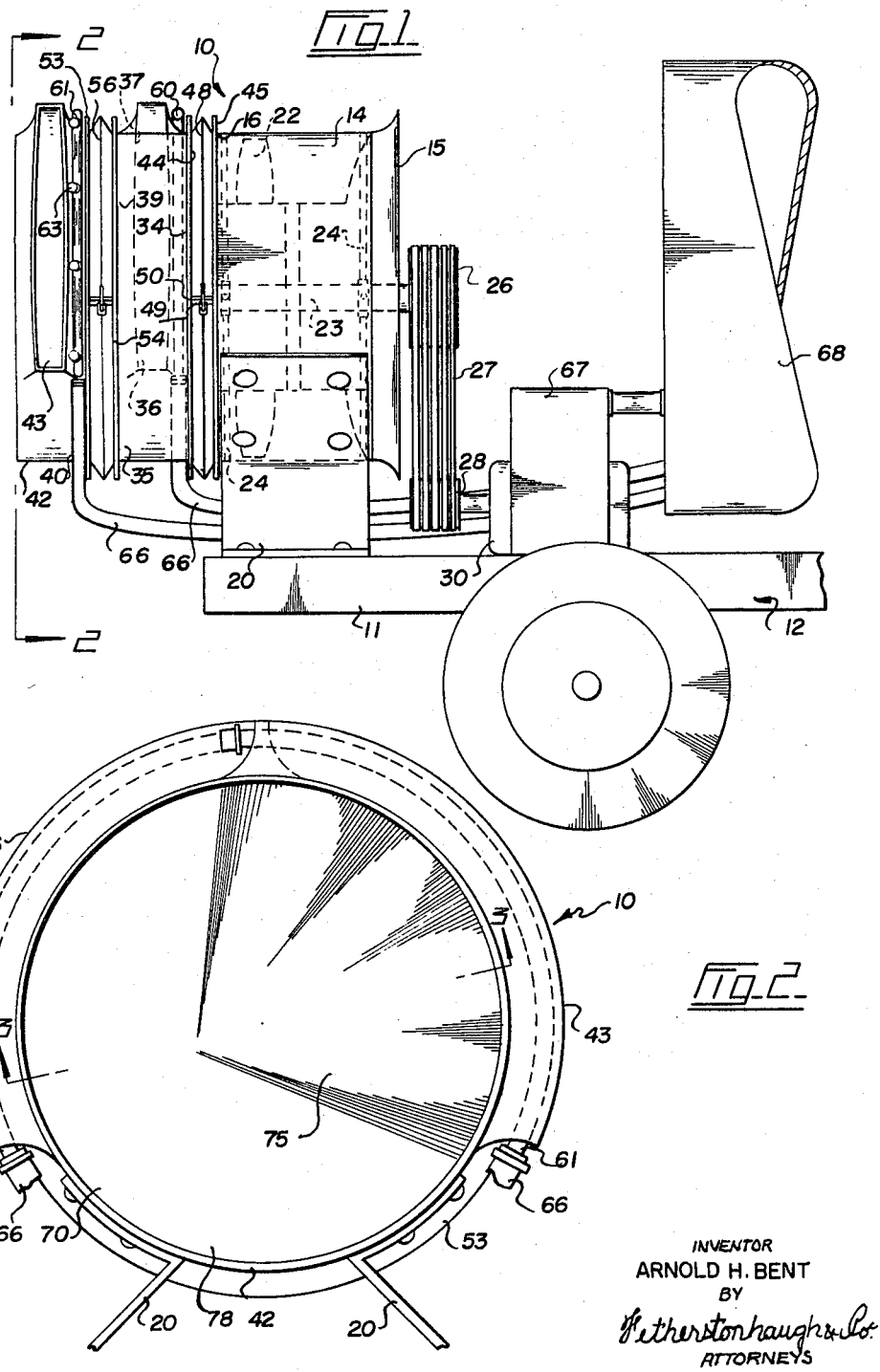
INVENTOR
ARNOLD H. BENT
BY
Featherstonhaugh & Co.
ATTORNEYS INVENTOR
ARNOLD H. BENT
BY
Fetherstonhaugh & Co.
ATTORNEYS _United States Patent Office_

3,384,305
Patented May 21, 1968

3,384,305
ANGULARLY ADJUSTABLE OUTLET MEMBERS FOR AGRICULTURAL SPRAYING APPARATUS
Arnold H. Bent, Penticton, British Columbia, Canada, assignor to Okanagan Turbo Sprayers Ltd., Penticton, British Columbia, Canada
Filed June 6, 1966, Ser. No. 555,428
1 Claim. (Cl. 239—77)

ABSTRACT OF THE DISCLOSURE

An agricultural sprayer having a fan arranged to discharge air axially into a housing formed of a pair of angularly adjustable annular parts. The housing is closed at one end by an end wall shaped to deflect the air radially outwardly through the openings in the housing.

---

Figure 3:
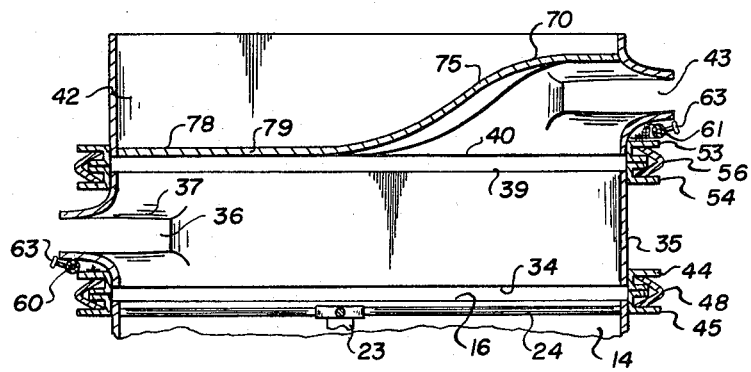

This invention relates to agricultural sprayers and more particularly to a type of sprayer wherein an air blast is arranged to carry the spray material from the spray area into the vegetation to be sprayed.

It is normal practice, in sprayers of this type, to employ centrifugal flow of fans which draw air axially into the casing in which they are housed and direct it radially outwardly therefrom. This type of fan is not very efficient and, in order to increase the efficiency, the casings in which the fans are housed are usually formed as volutes making the construction relatively difficult and therefore costly. Apparatus having axially flow fans have been designed wherein baffles and the like are employed to divert the air from an axial direction to a radial direction, but here again the overall efficiency of the apparatus is low due to the frictional forces involved in changing the direction of air flow.

The present invention provides apparatus of the latter type wherein an axial flow fan is used but which does not employ baffles or the like to change the direction of air flow and therefore provides an apparatus of high efficiency.

The present invention furthermore provides apparatus of this nature which is very simple and relatively inexpensive to produce.

The present invention comprises an axial flow fan, an elongated housing surrounding the fan through which the latter is arranged to direct a blast of air, a first annular casing mounted at the discharge end of the housing for rotation relative thereto, said casing having a circumferentially elongated peripheral opening formed therein, a second annular casing connected to said first annular casing for rotation relative thereto and having circumferentially elongated peripheral opening formed therein, an end wall closing the said second casing so as to direct the air outwardly through both openings, and means for discharging spray material into the air issuing from both openings.

Figure 4:
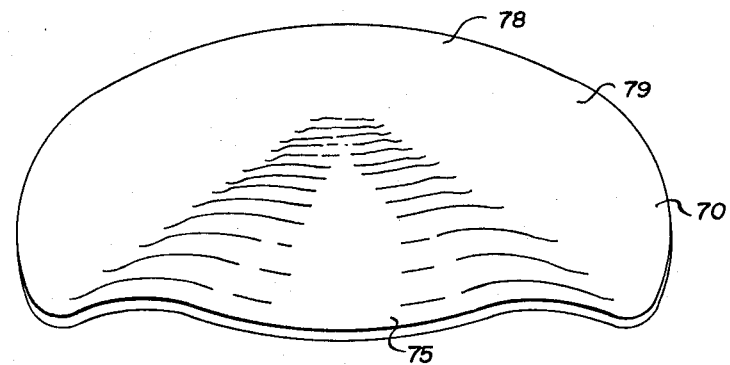

Referring to the drawings which illustrate the invention,

FIGURE 1 is a side view of the apparatus shown mounted upon the bed of the carriage, FIGURE 2 is an end view of the apparatus of FIGURE 1 in the direction 2—2 thereof, FIGURE 3 is a central sectional view of a portion of the apparatus taken along line 3—3 of FIGURE 2, and FIGURE 4 is an isometric view of the end wall of the apparatus.

Referring to the drawings, the apparatus accorded generally the numeral 10, is shown in side view mounted on the bed 11 of a trailer or truck 12 by means of which it may be easily transported through an orchard or the like.

The apparatus comprises an elongated annular fan housing 14 having a flared intake end 15 and a circular discharge end 16. This housing is mounted on brackets 20 by rivets or the like, said brackets being fixed securely to the bed 11 of the trailer.

Mounted for rotation in the housing 14, is an axial flow fan 22. This fan is mounted on a shaft 23 which is rotatably supported by braces 24 illustrated in FIGURES 1 and 2 and secured to the housing.

The shaft 23 of the fan extends from the intake end 15 of the latter and is provided with a pulley 26 which is driven via belts 27 to a drive pulley 28 driven by a suitable motor 30 fixed to the bed 11 of the trailer.

At the discharge end 16 of the housing one end 34 of a short annular casing 35 is journalled, said casing having a circumferentially elongated peripheral opening 36 formed therein, the walls 37 of the casing adjacent the opening being flared outwardly so that they extend beyond the normal periphery of the casing. At the other end 39 of the casing 35 is one end 40 of another short length annular casing 42 also having a circumferentially elongated peripheral opening 43 formed therein.

As illustrated in FIGURES 1 and 2, the rotatable connection between housing 14 and casing 35 is provided by means of a pair of U-shaped annular channel members 44 and 45, one 44 being secured to the end 16 of the housing and the other 45 being secured to the end 34 of the casing 35, over which an annular split ring 48 of V-shaped cross section is fitted. The split ring 48 normally has a loose fit on the U-shaped members 44 and 45 so that the casing 35 may be rotated relative to the housing 14, said split ring having end flanges 49 to which a suitable quick release connector 50 may be secured in order to tighten the split ring on the members 44 and 45 to maintain the casing 35 non-rotative relative to the housing 14. This form of connection of course will permit angular adjustment of the casing 35 relative to the housing 14 so that the opening 36 may be pointed in any radial direction.

The connection between casing 35 and casing 42 is identical to the last-mentioned connection, there being provided annular U-shaped members 53 and 54 secured to the casings 35 and 42 respectively over which the split ring 56, similar to the split ring 48, is fitted, the connection achieved permitting annular adjustment of the opening 43 relative to the opening 36.

Secured to each of the casings 35 and 42 are circumferentially elongated pipes 60 and 61 respectively, each provided with atomizing nozzles 63 directed towards the openings 36 and 43 respectively. These pipes 60 and 61 are connected via flexible conduits 66 to a pump 67 secured to the bed 11 of the trailer, said pump being supplied with spray material from a storage tank 68 also carried on the trailer. This pump may be driven by a separate motor, not shown, or may be driven by the motor 30 by suitable means.

The casing 42 is closed by an end wall 70. This end wall has a wedge-shaped or pie-shaped segment 75 deflected or deformed out of its normal planar surface, the peripheral edge of the end wall along said segment having a circumferential length a little longer than the circumferential length of the opening 43. The configuration of this segment is such that when viewed in cross section across its crest, takes the form of an ogee curve extending from the wall of the casing 42 centrally of the opening 43 past the centre of the plate. The surface of this segment adjacent said opening 43 is substantially parallel to the general planar surface of said end wall.

The end wall 70 is positioned in the casing 42 with the non-deformed portion of its peripheral edge herein accorded the numeral 78 adjacent the end 40 of the casing with the peripheral edge of the pie-shaped segment 75 between the other end of the annular casing 42 and the opening 43. It will thus be seen that the major portion herein accorded the numeral 79 of the end wall is normal to the direction of the flow of air entering said annular casing 42.

During the operation of the apparatus, the stream of air entering the casing 42 in line with the pie-shaped segment 75 will be diverted by the latter radially outwardly of opening 43. However, the air striking upon the portion of the end wall 79 which lies normal to the direction of said flow will cause said air to be compressed slightly, thereby resulting in the issuance of air radially out of the opening 36 in casing 35. It will be further appreciated that, as hereinbefore explained, both openings may be angularly adjusted relative to each other to either direct the air issuing therefrom in the same direction or in opposite direction, thereby enabling the equipment to spray either a single or double row of trees or the like at the same time. The shape of the casing walls, being flared outwardly at the openings, directs the air issuing therefrom radially outwardly without undue turbulence thereby permitting the spray material which is emitted by the nozzle to be carried a considerable distance outwardly into the foliage to be sprayed.

What I claim as my invention is:

1. Orchard spraying apparatus comprising an axial flow fan, an elongated housing surrounding the fan through which the latter is arranged to direct a blast of air, a first annular casing mounted at the discharge end of the housing for rotation relative thereto, said casing having a circumferentially elongated peripheral opening formed therein, a second annular casing connected to said first annular casing for rotation relative thereto and having a circumferentially elongated peripheral opening formed therein, an end wall closing the said second casing for directing the air outwardly through both openings, said end wall having a flat planar portion extending substantially normal to the axis of the fan and a curved portion extending radially outwardly from substantially the centre of said end wall in the form of an ogee curve, a peripheral portion of said curved portion adjacent the opening in the second casing extending substantially parallel to said flat planar portion, and means for discharging spray material into the air issuing from both openings.

References Cited

UNITED STATES PATENTS

| 2,476,960 | 7/1949 | Daugherty. |
| 2,661,242 | 12/1953 | Kurzbin. |
| 3,138,329 | 6/1964 | Swanson _____ 239—77 |
| 3,269,657 | 8/1966 | Ballu _____ 239—77 |

FOREIGN PATENTS

| 1,306,224 | 9/1962 | France. |
| 713,206 | 8/1954 | Great Britain. |

M. HENSON WOOD, Jr., *Primary Examiner.*

V. C. WILKS, *Assistant Examiner.*